(12) United States Patent
Limonciello et al.

(10) Patent No.: US 11,467,849 B2
(45) Date of Patent: Oct. 11, 2022

(54) SYSTEMS AND METHODS FOR COLLECTING DEEP OPERATING SYSTEM (OS) TELEMETRY

(71) Applicant: DELL PRODUCTS L.P., Round Rock, TX (US)

(72) Inventors: Mario A. Limonciello, Austin, TX (US); Juan M. Martinez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 16/859,031

(22) Filed: Apr. 27, 2020

(65) Prior Publication Data

US 2021/0334111 A1  Oct. 28, 2021

(51) Int. Cl.
*G06F 9/4401* (2018.01)
(52) U.S. Cl.
CPC .......... *G06F 9/4416* (2013.01); *G06F 9/4406* (2013.01)
(58) Field of Classification Search
None
See application file for complete search history.

(56) References Cited

U.S. PATENT DOCUMENTS 10,049,190 B1 *  8/2018  Newstadt ................ G06F 21/10
2008/0256349 A1 * 10/2008  Dennis .................. G06F 21/123
                                                                    713/1

OTHER PUBLICATIONS

Dell Support Assist, Dell Support Assist (formerly Dell System Detect): Overview And Common Questions, What Is Dell SupportAssist app (formerly Dell System Detect)?, Printed from Internet Apr. 8, 2020, 3 pgs.
Dell, "Restore Your System Using Dell SupportAssist OS Recovery", Printed from Internet Apr. 9, 2020, 9 pgs.
Dell, Using BIOSConnect To Recover SupportAssist OS Recovery Partition, "What Is Dell BIOS Connect?", Printed from Internet Apr. 9, 2020, 5 pgs.
Dell, "What Is BIOS Verification?", Printed from Internet Apr. 9, 2020, 3 pgs.

* cited by examiner

*Primary Examiner* — Fahmida Rahman
(74) *Attorney, Agent, or Firm* — Egan, Enders & Huston LLP

(57) ABSTRACT

Systems and methods are provided that may be implemented to utilize information from existing OS initialization mechanisms on an information handling system to determine characteristic/s of OS usage, and to record and store these determined characteristic/s as metadata on nonvolatile storage for later retrieval. In one embodiment, the determined characteristics for every given OS boot may be so recorded with information that identifies whether each given OS boot was from a manufacturer or vendor-supplied OEM OS image or from an aftermarket OS image.

20 Claims, 5 Drawing Sheets

SYSTEMS AND METHODS FOR COLLECTING DEEP OPERATING SYSTEM (OS) TELEMETRY

FIELD OF THE INVENTION

This application relates to operating systems of information handling systems and, more particularly, to collecting telemetry regarding operating system (OS) usage on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer manufacturers and vendors currently have no insight as to whether a computer end user is currently using the operating system (OS) that was originally shipped with the end user's computer, or as to whether the end user has switched to an different alternative OS. Existing telemetry collection mechanisms on end user computers rely upon a resident application running locally in a given computer system OS and this data is lost if the customer formats the machine, switches operating systems, and/or removes manufacturer or vendor OEM software and restores system to factory defaults. Thus, for example, a manufacturer or vendor of a given computer system cannot determine whether an end user switches from a supplied Linux OS to a different Microsoft Windows OS on the given computer system, or vice-versa. Nor can a manufacturer or vendor of a given computer system determine whether an end user changes from an original equipment manufacturer (OEM) Linux OS and a non-OEM Linux OS on the given computer system, nor whether an end user is using a potentially unlicensed copy of an OS such as Windows OS.

SUMMARY OF THE INVENTION

Systems and methods are disclosed herein that may be implemented in one embodiment to utilize information from existing software initialization mechanisms built directly into an operating system (OS) of an information handling system as a proxy to determine characteristic/s of OS usage, and to record and store these determined OS usage characteristic/s as metadata on nonvolatile storage, such as in the form of extensible firmware interface (EFI) variables written to non-volatile random access memory (NVRAM) of an embedded controller (EC) or otherwise for later retrieval. In one embodiment, the determined characteristics for every given OS boot (e.g., every Microsoft Windows OS and/or Linux OS boot) may be so recorded with information that identifies whether each given OS boot was from a manufacturer or vendor-supplied OEM OS image or from an aftermarket OS image.

In one embodiment, the disclosed systems and methods may be implemented to identify and leverage differences between the initialization characteristics of different types of operating systems (e.g., such as the differences in initialization characteristics between a Microsoft Windows OS and a Linux OS) on an information handling system, as well as the presence of any OS licensing keys (e.g., such as Windows OS licensing keys) on the information handling system, to accurately determine and/or map any changes made to the installed OS that deviates from how the OS was originally shipped with the information handling system hardware to the end user. In this way, changes made to the system OS by the end user may be tracked and recorded locally as OS history data on non-volatile storage of the information handling system.

In a further embodiment, locally-recorded OS history data may later be retrieved from a given information handling system as telemetry sent from the given information handling system across a network (e.g., such as the Internet) to a remote information handling system, e.g., such as a server operated by the manufacturer or vendor of the given information handling system. When so retrieved, this OS history data may be mapped (e.g., compared) against one or more manufacturing database/s (e.g., containing a record of the original system OS installed on the given system) to determine what changes have been made to the system OS by the end user since the time that the given information handling system was shipped to the end user. In some embodiments, automatic actions may be taken based on this determination of end user changes made to the system OS from the OS history data, such as modification of nature or type of automatic OS updates for the system, and/or requiring an end user to enter a valid proprietary OS license key to receive additional manufacturer or vendor updates. When OS history data is retrieved over an extended period of time from multiple different information handling systems, this OS history data may in one embodiment be analyzed to identify OS-usage trends (e.g., such as identifying a trend that a certain portion of end users are replacing (or supplementing) a proprietary OEM-supplied OS with an open source OS, or vice-versa).

In one embodiment, firmware-based data collection may be employed to locally capture and record OS history data in non-volatile storage of a given local information handling system, and then transmit the recorded OS history data across a network to a remote information handling system (e.g., server) without the installation and use of an application that executes on the system OS of the local information handling system. This advantageously allows OS history data to be captured, recorded (stored) and then retrieved from the non-volatile storage of the given local information handling system using local system firmware and in a manner that is resistant to end user tampering. In this regard, OS history data may be captured, recorded (stored) and then retrieved from the local information handling system without requiring or relying on the end user to install any resident application to execute on the OS of the local system for accomplishing these tasks, and in a manner that may be persisted for the useful life of the given local information handling system. In a further embodiment, the disclosed systems and methods may be implemented to optionally allow the end user to asynchronously retrieve the recorded OS history data using system software tools executing on the local information handling system, such as a user assistance application.

In one respect, disclosed is a method, including performing the following steps when booting a current operating system (OS) for execution on a programmable integrated circuit of a local information handling system: accessing firmware on non-volatile memory of the local information handling system to determine whether or not existing OS license data is stored on the non-volatile memory; initializing the current OS; determining a type of the current initialized OS based on unique OS initialization characteristics that are specific to the current the current OS; storing OS history information on the non-volatile memory of the local information handling system, the OS history information indicating the determined type of current initialized OS and indicating whether or not existing OS license data is stored on the non-volatile memory; retrieving the stored OS history information from the non-volatile memory of the local information handling system; and transmitting the retrieved OS history information across a network from the local information handling system to a separate and remote information handling system.

In another respect, disclosed herein is a local information handling system, including: a programmable integrated circuit; and non-volatile memory coupled to the programmable integrated circuit. The programmable integrated circuit may be programmed to boot a current operating system (OS) by: accessing firmware on the non-volatile memory of the local information handling system to determine whether or not existing OS license data is stored on the non-volatile memory, initializing the current OS, determining a type of the current initialized OS based on unique OS initialization characteristics that are specific to the current the current OS, storing OS history information on the non-volatile memory, the OS history information indicating the determined type of current initialized OS and indicating whether or not existing OS license data is stored on the non-volatile memory; retrieving the stored OS history information from the non-volatile memory of the local information handling system; and transmitting the retrieved OS history information across a network coupled to the programmable integrated circuit from the local information handling system to a separate remote information handling system.

In another respect, disclosed herein is a system including a local information handling system coupled across a network to a separate remote information handling system. The local information may include: a programmable integrated circuit; and non-volatile memory wcoupled to the programmable integrated circuit. The programmable integrated circuit of the local information handling system may be programmed to boot a current operating system (OS) on the local information handling system by: accessing firmware on the non-volatile memory of the local information handling system to determine whether or not existing OS license data is stored on the non-volatile memory, initializing the current OS, determining a type of the current initialized OS based on unique OS initialization characteristics that are specific to the current the current OS, storing OS history information on the non-volatile memory, the OS history information indicating the determined type of current initialized OS and indicating whether or not existing OS license data is stored on the non-volatile memory, retrieving the stored OS history information from the non-volatile memory of the local information handling system, and transmitting the retrieved OS history information across the network coupled to the remote information handling system.

DESCRIPTION OF ILLUSTRATIVE EMBODIMENTS

Figure 1:
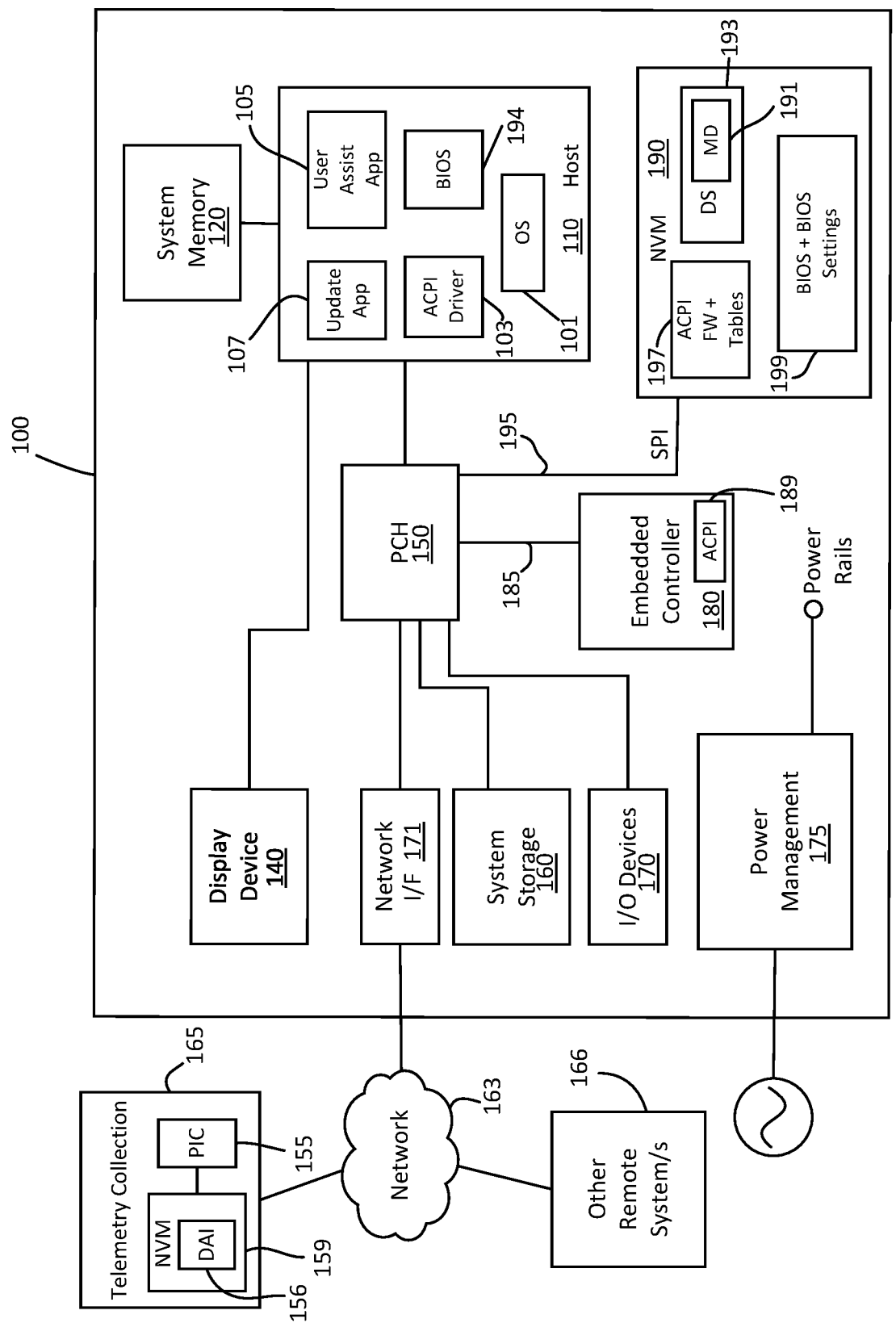
FIG. 1 illustrates a block diagram of an information handling system according to one exemplary embodiment of the disclosed systems and methods.

FIG. 1 is a block diagram of a local information handling system 100 (e.g., a desktop computer, laptop computer, tablet computer, MP3 player, personal data assistant (PDA), cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host programmable integrated circuit 110 for executing an operating system (OS) 101 (e.g., proprietary OS requiring license key/s such as Microsoft Windows 10, open source OS not requiring license key/s such as Linux OS, etc.) and BIOS 194 for system 100, and other code such as user software applications 102 (e.g., word processing application, Internet browser, computer game, PDF viewer, spreadsheet application, etc.), user assistance application 105 (e.g., such as the Dell SupportAssist application or Dell Linux Assistant application available from Dell Technologies, Inc. of Round Rock, Tex.) that performs OS-related tasks such as providing the system end user with access to data and/or automatically performs OS recovery tasks when OS 101 is damaged, a manufacturer or vendor update application 107 (e.g., such as Dell Update application available from Dell Technologies, Inc. of Round Rock, Tex.), etc. Applications such as user assistance application 105 and update application 107 may be parts of a manufacturer or vendor-supplied OEM software image that includes an original OEM OS and that is shipped with system 100 to the end user. An Advanced Configuration and Power Interface (ACPI) driver 103 may also be executed on host programmable integrated circuit 110 as shown.

In FIG. 1, host programmable integrated circuit 110 may be configured to access non-volatile memory 190 (e.g., serial peripheral interface (SPI) Flash memory) to load and boot part of a system BIOS 194. Other non-volatile memory (NVM) devices may be additionally or alternatively present, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled to system memory 120, which may include, for example, random access memory (RAM), dynamic RAM (DRAM), synchronous DRAM (SDRAM).

In the illustrated embodiment, host programmable integrated circuit 110 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

PCH 150 controls certain data paths and manages information flow between components of the information handling system 100. As such, PCH 150 may include one or more integrated controllers or interfaces for controlling the data paths connecting PCH 150 with host programmable integrated circuit 110, system storage 160, input/output (I/O) devices 170 forming at least a part of a user interface for the information handling system, network interface (I/F) device 171, embedded controller (EC) 180 executing ACPI instance 189, and NVM 190 where BIOS firmware image and settings 199 may be stored together with other components including ACPI firmware 197, and EC data store 193 that includes among other things, OS history metadata 191 that includes historical information regarding OS usage characteristics on system 100. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown, external and/or internal (integrated) I/O devices 170 (e.g., a keyboard, mouse, touchpad, touchscreen, etc.) may be coupled to PCH 150 of system 100 to enable the system end user to input data and interact with information handling system 100, and to interact with application programs or other software/firmware executing thereon. The network I/F device 171 enables wired and/or wireless communication with a remote telemetry-collection server 165 and other remote information handling systems 166 (e.g., such as manufacturer or vendor BIOS update server, etc.) via an external network 163 (e.g., the Internet), and in one embodiment may be a network interface controller (NIC) which may communicate with external network 163 across an intervening local area network (LAN), wireless LAN (WLAN), cellular network, etc.

Also shown in FIG. 1 is data analysis information (DAI) 156 that may be maintained in non-volatile memory 159 of remote telemetry-collection server 165 (or other remote information handling system 166) and used for remote analysis in a manner described further herein. Such remote analysis may be performed by a programmable integrated circuit 155 (e.g., CPU) of remote telemetry-collection server 165. In this regard, remote telemetry-collection server 165 and each of remote information handling systems 166 may be configured in one embodiment with similar components and system architecture as information handling system 100.

Also shown present in FIG. 1 is local system storage 160 (e.g., one or more media drives, such as hard disk drives, optical drives, NVRAM, Flash memory, solid state drives (SSDs), or any other suitable form of internal or external storage) that is coupled through PCH 150 to provide non-volatile storage for information handling system 100.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

Embedded controller (EC) 180 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

FIG. 2A illustrates one exemplary embodiment of methodology 200 that may be employed by BIOS 194 and OS 101 executing on host programmable integrated circuit 110 of local information handling system 100 to capture and store (record) OS history data as metadata 191 on NVM 190 during bootup of information handling system 100. As shown methodology 200 starts in step 202 where the system end user powers on local information handling system 100. Next in step 204, BIOS 194 loads the OS bootloader and methodology 200 proceeds to step 206 where OS 101 loads kernel drivers.

Next, in step 208, OS 101 accesses ACPI tables (i.e., which are provided from ACPI firmware 197 in step 210 by BIOS 194), enumerates ACPI interfaces from the BIOS ACPI tables for the system devices that OS 101 has permission to access, e.g., windows management instrumentation (WMI) or Linux counterpart (e.g., wmi.ko) then enumerates all ACPI interface values from ACPI tables. Matching drivers (e.g., drivers/platform/* .ko in Linux) load to associate to these ACPI tables, and OS 101 initiates the ACPI devices according to the enumerated ACPI interface values. In one embodiment, acpi.sys loads from BIOS firmware 199 during system startup and initializes all management object format (MOF) data and associated ACPI functions.

Next in step 212, OS 101 calls an ACPI initialization method in BIOS 194 with arguments that are specific to the current OS 101 (e.g., uniquely specific to either a proprietary Microsoft Windows OS or an open-source Linux OS). At this time, initialization will call the ACPI source language (ASL) corresponding to the current type of OS 101 (e.g., proprietary Microsoft Windows OS or open-source Linux OS), and BIOS 194 responds in step 214 by invoking a system management interrupt (SMI) to execute system management mode (SMM) code. Then, in step 216, BIOS 194 checks NVM 190 for the presence of OS license data (such as license key/s for an OEM proprietary OS) in BIOS firmware image and settings 199, which will be present in BIOS firmware image and settings 199 when the information handling system 100 was originally shipped to the end user with an OEM proprietary OS (e.g., Microsoft Windows OS). It is noted that such OS license data is present to verify that a valid license exists for the system 100 to run the corresponding proprietary OS, and is therefore conventionally accessed by only the corresponding proprietary OS when the proprietary OS is booted to verify a valid license exists on the system that is attempting to boot the proprietary OS.

Next in step 218, BIOS 194 records or stores OS history data as metadata 191 on NVM 190. This locally recorded or stored OS history data of metadata 191 may include boot information indicating the type of current OS initialization session and therefore the type of current OS (e.g., the type of current OA initialization session and therefore current OS may be determined from specific OS initialization characteristics used for the current OS such as the unique OS-specific arguments used in step 212 by OS 101 to call the ACPI initialization method by BIOS 194 in step 214). Information identifying the type of OS currently being booted may be stored as part of OS history metadata 191 (e.g., by incrementing and recording a corresponding initialization or boot counter in the metadata 191 for the current type of OS being booted, for example, a proprietary OS, an open source OS, or any other OS type). OS history metadata 191 stored on NVM 190 in step 218 may also include information regarding presence or absence on system 100 of a valid license for a proprietary OS as determined by BIOS 194 in step 216, and may be stored on NVM 190, for example, by recording in the metadata 191 an indication that OS license data containing valid license (license key/s) is either present or not present in the BIOS firmware image and settings 199 of system 100. As described further herein, the OS history data stored as metadata 191 in step 218 is indicative of characteristics of OS usage history on information handling system 100 since it was delivered to the end user.

After step 212, OS 101 loads the user space in step 220, and proceeds with OS runtime during which the system end user then operates the information handling system in step 222 during OS runtime.

Figure 2:
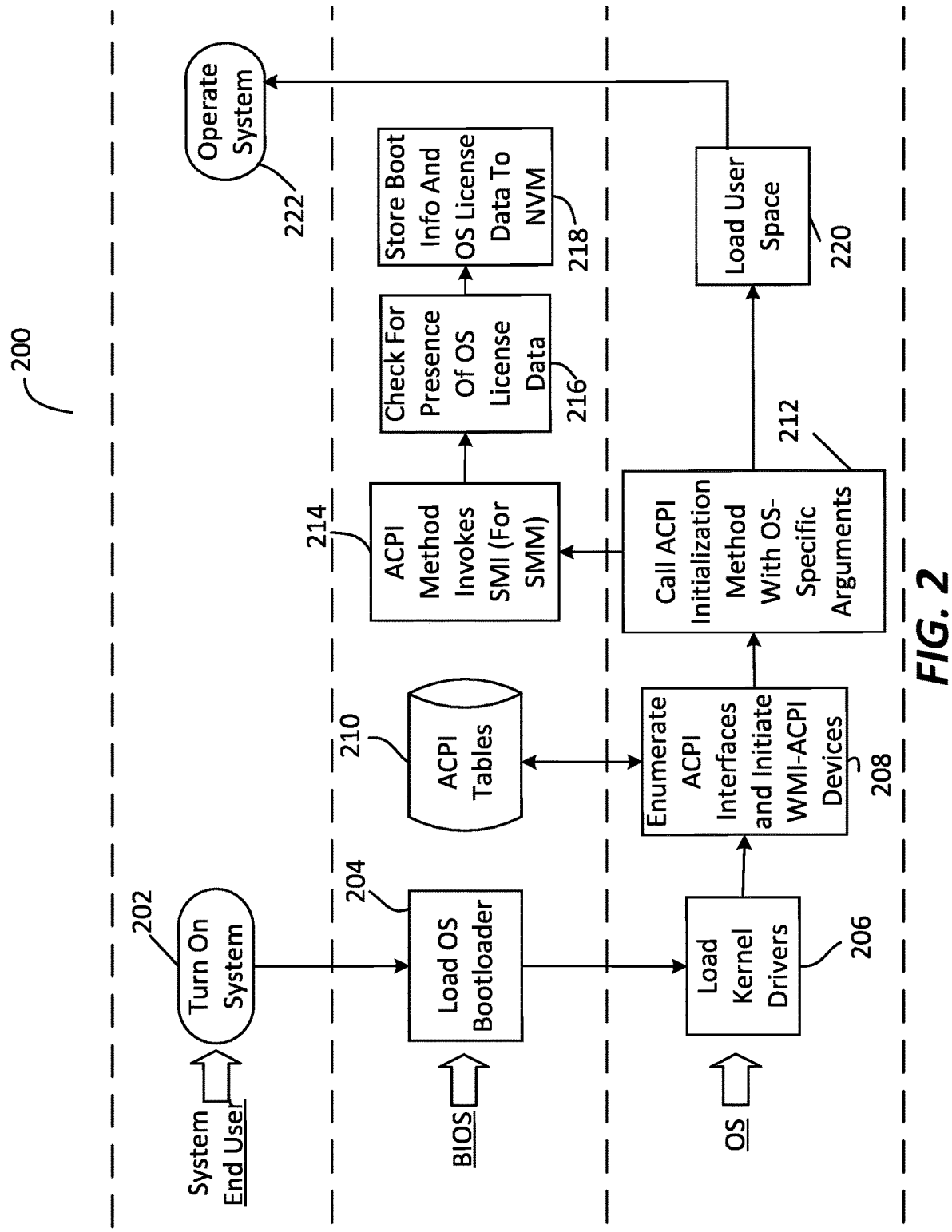
FIG. 2 illustrates methodology according to one exemplary embodiment of the disclosed systems and methods.

Thus, among other things, OS history metadata 191 created using methodology 200 of FIG. 2 may contain information recorded during previous boots of information handling system 100 that indicates, for example, cumulative number of times that at least two different OS types have been initialized of booted up on system 100, and whether a valid license (e.g., proprietary OS license keys are present) exists on the information handling system 100 for running a corresponding proprietary OS. As an example, metadata 191 may include a counter for the cumulative number of boot sessions to date into a proprietary OS (e.g., Microsoft Windows 10 OS) and a separate counter for the cumulative number of boot sessions to date into an open source OS (e.g., Linux OS), as well as indication of presence of valid license for the proprietary OS. It will be understood that more than three of more boot counters may be maintained in metadata 191 for respective three or more different OS types in other embodiments, and/or that counters may be maintained in metadata 191 for other proprietary OS types (i.e., other than Microsoft Window 10) and/or other open source OS types (i.e., other than Linux OS).

Table 1 below indicates a hypothetical example of OS usage characteristic information that may be included in OS history metadata 191 (e.g., as a lookup table) on NVM 190 of a local information handling system 100 after a total of 81 system boots. As further described in relation to Table 2 herein, a further analysis of the example OS history metadata of Table 1 may be made to determine that: 1) the information handling system 100 was originally shipped from the factory to the system end user with a proprietary OEM Microsoft Windows OS loaded on the system 100 together with its corresponding valid license (e.g., since presence of the license data (e.g., license key/s) in BIOS firmware image and settings 199 indicates that system 100 was factory-shipped to the end user with the OEM Microsoft Windows OS loaded); and 2) the system end user subsequently replaced (or supplemented) the OEM Microsoft Windows OS with an open source Linux OS (e.g., since the open source Linux OS has been booted on the system 100 that was originally factory shipped with proprietary Microsoft Windows OS). In this regard, an end user may supplement a proprietary OS with an open source OS, for example, to allow dual-booting capability into both operating systems on the system 100.

TABLE 1

Example OS History Metadata Content

| OS History Metadata Item | Item Value |
|---|---|
| Proprietary OS (e.g., Microsoft Windows OS) Cumulative Boot Counter | 5 |
| Open Source OS (e.g., Linux) Cumulative Boot Counter | 76 |
| Is License Present for the Proprietary OS (e.g., Microsoft Windows OS)? | Yes |

Once OS history metadata 191 has been captured and locally stored on NVM 190 as described in relation to FIG. 2 it may be later retrieved from information handling system 100 using one or more of a number of different metadata retrieval flows, and whether or not the original manufacturer or vendor-supplied OEM image currently remains present and running on the system 100. Examples of such different OS history metadata retrieval techniques include, but are not limited to, during an update to BIOS 194, by a user assistance application 105, by a manufacturer or vendor update application 107, etc.

Figure 3:
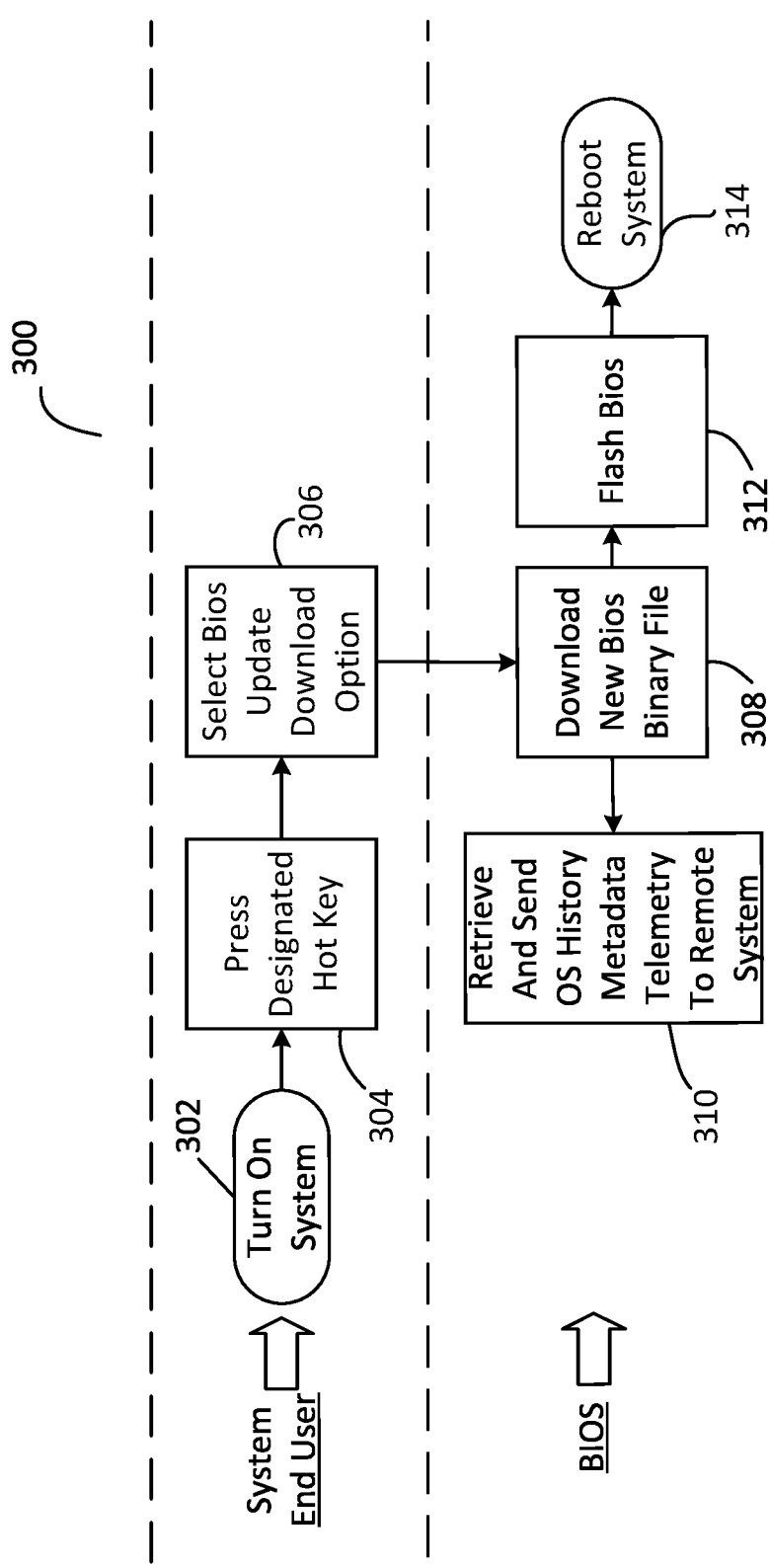
FIG. 3 illustrates methodology according to one exemplary embodiment of the disclosed systems and methods.

FIG. 3 illustrates an OS history metadata retrieval methodology 300 according to one exemplary embodiment which may be implemented by system BIOS 194 as part of an end user-initiated update (download and flash) to BIOS 194. As shown, methodology 300 starts in step 302 where the end user turns on the local information handling system 100, and then in step 304 presses the F12 key (or other designated hot key) during the power-on-self-test (POST) to display a menu of POST options on display 140 that include an option to request a BIOS update. In step 306, the end user selects the displayed menu option corresponding to the request to download and flash an update to BIOS 194. In step 308, BIOS 194 responds to the user selection of step 306 by requesting and downloading a BIOS update binary file package across network 163, e.g., from a remote server 166 maintained by the system manufacturer or vendor.

In addition to flashing the BIOS firmware and settings 199 with the downloaded BIOS update package in step 312, BIOS 194 may also retrieve OS history metadata 191 from NVM 190 and send telemetry including the retrieved OS history metadata 191 across network 163 to remote telemetry collection server 165 in step 310. It will be understood that in other embodiments the OS history metadata 192 may be sent in step 310 to another designated backend server or other remote information handling system, e.g., such as the same server from which the BIOS update package is downloaded as binary in step 308. Then in step 314, BIOS 194 reboots information handling system 100 which boots to OS 101 and normal OS runtime proceeds.

Figure 4:
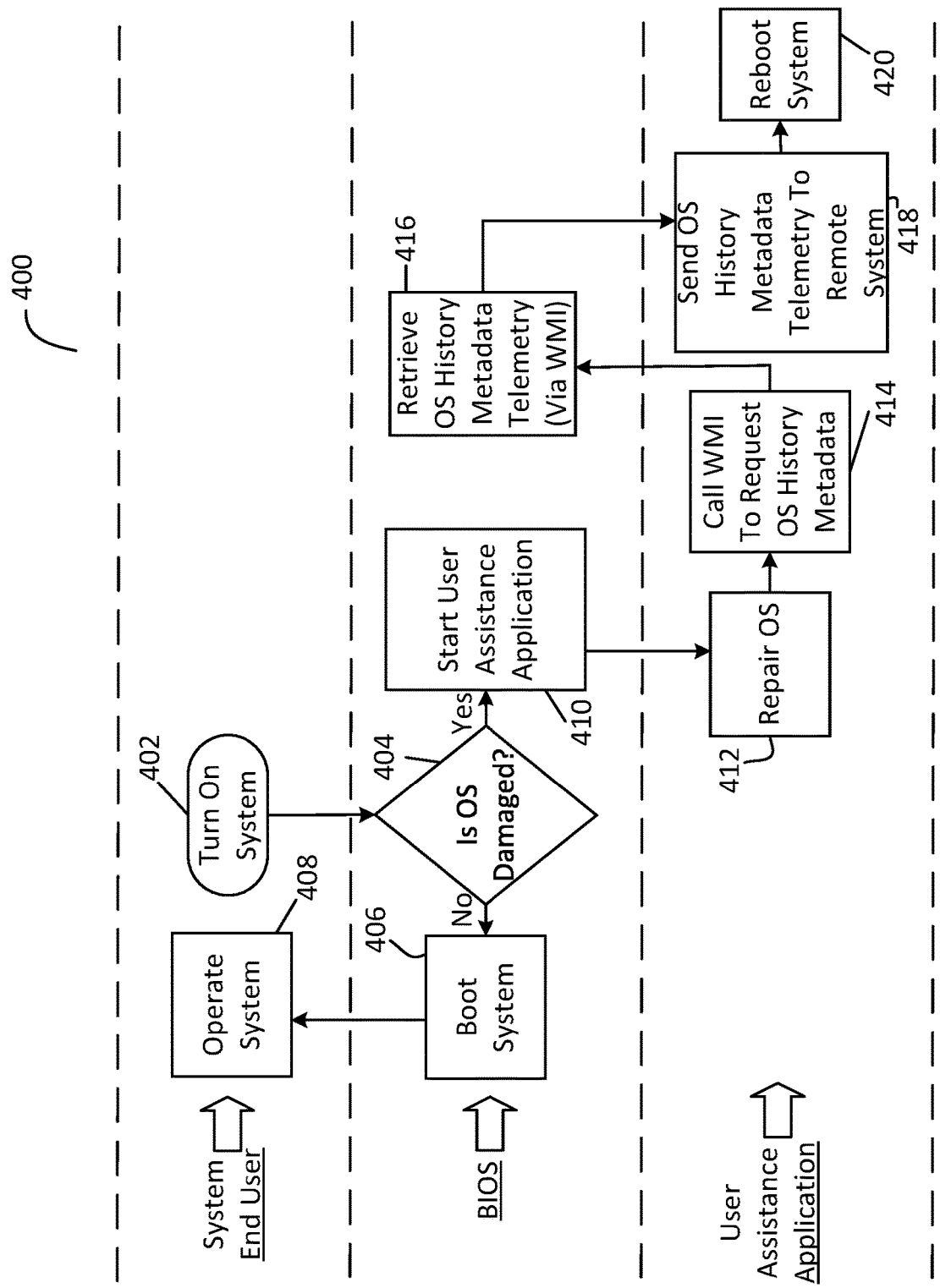
FIG. 4 illustrates methodology according to one exemplary embodiment of the disclosed systems and methods.

FIG. 4 illustrates another OS history metadata retrieval methodology 400 according to a different exemplary embodiment which may be implemented by user assistance application 105, e.g., in a case where the current OS 101 is damaged and must be repaired and recovered before booting the local system 100. As shown, methodology 400 starts in step 402 where the end user turns on the information handling system 100. In step 404 BIOS 194 executes to detect whether OS 101 is damaged, and if not, then boots system 100 to OS 101 in step 406 and the system end user then operates the system 100 in step 408.

However, if BIOS 194 detects in step 404 that OS 101 is damaged, then BIOS 194 responds to this detection of damaged OS 101 in step 410 by starting the user assistance application 105. Then user assistance application 105 executes in step 412 to run diagnostics and repair OS 101 accordingly. User assistance application 105 then calls WMI in step 414 to request OS history metadata 191 from BIOS 194, and BIOS 194 retrieves OS history metadata 191 from NVM 190 and passes the retrieved OS history metadata 191 to user assistance application 105 in step 416. Then, in step 418 user assistance application 105 sends telemetry including the retrieved OS history metadata 191 across network 163 to remote telemetry collection server 165, or to another remote backend server designated for OS history metadata telemetry collection. User assistance application 105 then reboots information handling system 100 in step 420, in which case BIOS 194 boots to OS 101 and normal OS runtime proceeds.

Figure 5:
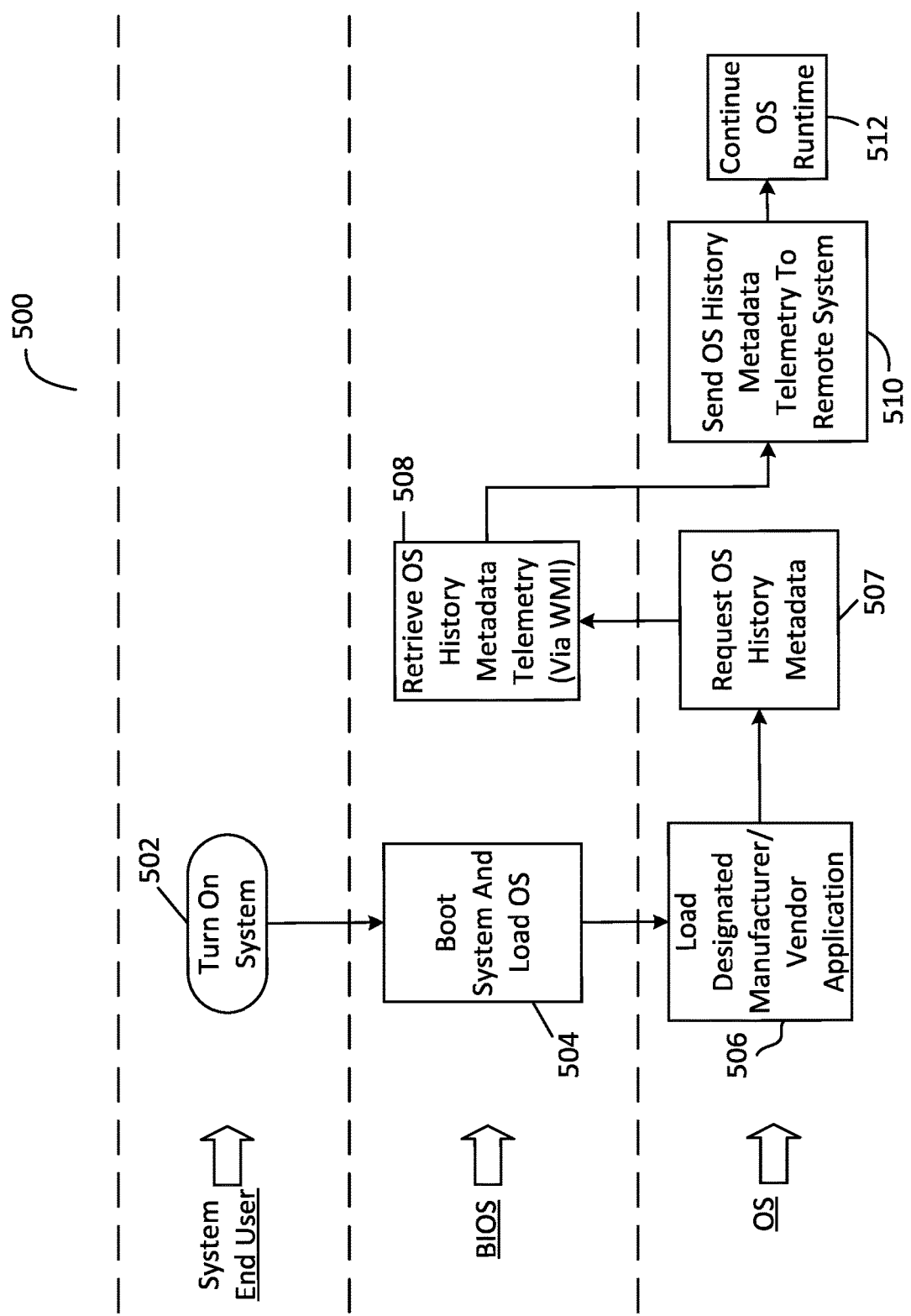
FIG. 5 illustrates methodology according to one exemplary embodiment of the disclosed systems and methods.

FIG. 5 illustrates another OS history metadata retrieval methodology 500 according to a different exemplary embodiment which may be automatically implemented by OS 101 in conjunction with a designated manufacturer or vendor software application such as user assistance application 105 or update application 107 (e.g., Linux update assistance application). As shown, methodology 500 starts in step 502 where the end user turns on the local information handling system 100. In step 504 BIOS 194 executes to boot up system 100 and load OS 101. Next, in step 506, OS 101 automatically loads a designated manufacturer or vendor software application such as user assistance application 105 or update application 107. The designated manufacturer or vendor software application executes in step 506 to cause OS 101 to request OS history metadata 191 from BIOS 194 in step 507, and BIOS 194 retrieves OS history metadata 191 from NVM 190 and passes the retrieved OS history metadata 191 to OS 101 in step 508. Then, in step 510, OS 101 sends telemetry including the retrieved OS history metadata 191 across network 163 to remote telemetry collection server 165 or to another remote backend server designated for OS history metadata telemetry collection. Then normal OS runtime proceeds in step 512.

Once telemetry containing the OS history metadata 191 for information handling system 100 is collected at remote telemetry collection server 165, it may be analyzed (e.g., by programmable integrated circuit/s on telemetry collection server 165 or programmable integrated circuit/s of other remote information handling system/s 166) to determine identity of the current OS executing on system 100 relative to original OEM OS shipped with system 100, and to take one or more automatic actions accordingly.

Table 2 is an example data truth table that may be maintained as data analysis information 156 on a remote information handling system (e.g., such as remote telemetry-collection server 165 or other remote information handling system 166) and employed in one embodiment using the OS history metadata 191 for such a remote analysis. In this embodiment, one row of the data truth table may be selected that corresponds to the detected presence or absence of license for proprietary OS on the local information handling system 100, and one column of the data truth table may be selected that corresponds to the recorded and stored OS boot history of the local information handling system 100. The table entry that corresponds to the intersection of the selected row and column of the data truth table may be selected as the determination of the relation between the current OS executing on system 100 relative to the original OEM OS shipped with system 100. For example, as described further below, if a license for a proprietary OS is present on system 100 and the system has only been booted into the proprietary OS, then it is determined that the system is currently using a factory-shipped proprietary OS.

TABLE 2

Data Truth Table Based for OS History Metadata

| Is License for Proprietary OS Present on System? | System Has Only Been Booted Into Proprietary OS | System Has Only Been Booted Into Open Source OS | System Has Been Booted Into Both Proprietary OS and Open Source OS |
| --- | --- | --- | --- |
| Yes | The system is currently using a factory-shipped proprietary OS | A factory-shipped proprietary OS has been replaced on the system with the current open source | A factory-shipped proprietary OS has been replaced by (or supplemented with) the open source OS on the system. |

TABLE 2-continued

Data Truth Table Based for OS History Metadata

| Is License for Proprietary OS Present on System? | System Has Only Been Booted Into Proprietary OS | System Has Only Been Booted Into Open Source OS | System Has Been Booted Into Both Proprietary OS and Open Source OS |
|---|---|---|---|
| No | A factory-shipped open source OS has been replaced on the system with the current proprietary OS | OS The system is currently using a factory-shipped open source OS | A factory-shipped open source OS has been replaced by (or supplemented with) the proprietary OS on the system. |

As shown in Table 2, presence of a license for a proprietary OS on information handling system 100 indicates that the proprietary OS was shipped with the system 100 to the end user, whereas absence of such a license indicates that an open source OS was shipped with the system 100 to the end user.

Thus, in the case that the OS cumulative boot counters indicate that only an open source OS has booted onto a system 100 that has a license present for a proprietary OS, this means that the factory-shipped proprietary OS has been replaced on the system with the current open source OS. Automatic actions that may be remotely triggered by such a determination include, but are not limited to, changing the type of remote manufacturer or vendor updates to be made to system 100 from remote information handling system/s 165 and/or 166 so that they correspond to the current type of OS being used (in this case an open source OS such as Linux).

In the case that the OS cumulative boot counters indicate that both an open source OS and proprietary OS have booted onto a system 100 that has a license present for a proprietary OS, this means that the factory-shipped proprietary OS has either been replaced or supplemented on the system with the current open source OS. Automatic actions that may be remotely triggered by such a determination include, but are not limited to, implementing a confirmation action from remote information handling system/s 165 and/or 166 asking the local system end user to confirm the continued presence and use of the proprietary OS on system 100 before downloading any future manufacturer or vendor updates to local system 100, and accordingly modifying the type of remote manufacturer or vendor updates to be made to system 100 from remote information handling system/s 165 and/or 166 so that they correspond to the current type/s of OS being used (in this case by adding updates for an open source OS such as Linux and possibly terminating updates for the proprietary OS based on the local system end user indicating the proprietary OS is no longer present and used on system 100).

On the other hand, if the OS cumulative boot counters indicate that only the proprietary OS has booted onto a system 100 that has a license present for the proprietary OS, then this means that the system is currently using the factory-shipped proprietary OS. No remotely-triggered automatic actions are necessary upon such a determination.

Still referring to Table 2, in the case that that the OS cumulative boot counters indicate that only the proprietary OS has booted onto a system 100 that does not have a license present for the proprietary OS, then this means that a factory-shipped open source OS has been replaced on the system with a proprietary OS, which may be an unlicensed copy. Automatic actions that may be remotely triggered by such a determination include, but are not limited to, flagging the current OS of system 100 as being a potential unlicensed copy of proprietary OS and implementing a confirmation action from remote information handling system/s 165 and/or 166 by requiring the local system end user to enter a valid OS license key for the proprietary OS before downloading any future manufacturer or vendor updates to local system 100.

In the case that the OS cumulative boot counters indicate that both an open source OS and proprietary OS have booted onto a system 100 that does not have a license present for a proprietary OS, this means that the factory-shipped open source OS has either been replaced or supplemented on the system with the current open source OS. Automatic actions that may be remotely triggered by such a determination include, but are not limited to, flagging the current proprietary OS of system 100 as being a potential unlicensed copy of proprietary OS and implementing a confirmation action from remote information handling system/s 165 and/or 166 by requiring the local system end user to enter a valid OS license key for the proprietary OS before downloading any future manufacturer or vendor updates to local system 100. A separate confirmation action from remote information handling system/s 165 and/or 166 may also be implemented in this case that asks the local system end user to confirm the continued presence and use of the open source OS on system 100. The type of remote manufacturer or vendor updates to be made to system 100 from remote information handling system/s 165 and/or 166 may then be accordingly modified based on the responses of the local system end user to the above confirmation requests so that future updates correspond to the current type/s of OS that are present and being used on system 100 (in this case by adding updates for a proprietary OS where the local system end user proves possession of a license for the proprietary OS, and possibly terminating updates for the open source OS based on the local system end user indicating that the open source OS is no longer present and used on system 100).

However, if the open source OS cumulative boot counter indicates that only an open source OS has booted onto a system 100 that does not have a license present for a proprietary OS, this means the system 100 is currently using a factory-shipped open source OS. No remotely-triggered automatic actions are necessary upon such a determination.

It will understood that the particular combination of steps of FIGS. 3, 4 and 5 are exemplary only, and that other combinations of additional and/or alternative steps may be employed that are suitable for capturing, recording and utilizing information from OS initialization mechanisms of a local information handling system to determine characteristic/s of OS usage, and/or for transmitting these characteristics as OS history metadata telemetry to a remote information handling system for further analysis and action.

It will also be understood that one or more of the tasks, functions, or methodologies described herein (e.g., including those described herein for components 110, 165, 166, 171, 180, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising performing the following steps during booting of a current operating system (OS) on a programmable integrated circuit of a local information handling system:
   accessing firmware on non-volatile memory of the local information handling system to determine whether or not existing OS license data is stored on the non-volatile memory;
   initializing the current OS for execution on the programmable integrated circuit of the local information handling system;
   determining a type of the current initialized OS based on unique OS initialization characteristics that are specific to the current OS, the OS initialization characteristics comprising unique OS-specific arguments used by the current OS to call an Advanced Configuration and Power Interface (ACPI) initialization method;
   storing OS history information on the non-volatile memory of the local information handling system, the OS history information indicating the determined type of current initialized OS and indicating whether or not existing OS license data is stored on the non-volatile memory;
   retrieving, via the firmware, the stored OS history information from the non-volatile memory of the local information handling system; and
   transmitting the retrieved OS history information across a network from the local information handling system to a separate and remote information handling system.

2. The method of claim 1, where the step of storing OS history information on the non-volatile memory of the local information handling system comprising incrementing a boot counter corresponding to the determined type of current initialized OS that is maintained as OS history information on the non-volatile memory of the local information handling system.

3. The method of claim 1, further comprising executing a programmable integrated circuit of the remote information handling system to analyze the retrieved OS history information to determine a type of a first OS that was originally installed on the local information handling system, and a type of any second OS that was installed on the local information handlings system after the first OS was installed on the local information handling system.

4. The method of claim 3, where executing the programmable integrated circuit of the remote information handling system to analyze the retrieved OS history information comprises analyzing the retrieved OS history information using predefined data analysis information stored in non-volatile memory of the remote information handling system.

5. The method of claim 3, further comprising executing the programmable integrated circuit of the remote information handling system to take at least one automatic action based on the determined type of the first OS that was originally installed on the local information handling system and the determined type of any second OS that was installed after the first OS on the local information handling system; and where the automatic action comprises either changing a type of remote manufacturer or vendor updates to be made to the local system, or requiring a user of the local system to enter a valid OS license key for a type of proprietary OS executing on the local system before downloading any future manufacturer or vendor updates to the local system.

6. A method, comprising performing the following steps during booting of a current operating system (OS) on a programmable integrated circuit of a local information handling system:
    accessing firmware on non-volatile memory of the local information handling system to determine whether or not existing OS license data is stored on the non-volatile memory;
    initializing the current OS for execution on the programmable integrated circuit of the local information handling system;
    determining a type of the current initialized OS based on unique OS initialization characteristics that are specific to the current OS;
    storing OS history information on the non-volatile memory of the local information handling system, the OS history information indicating the determined type of current initialized OS and indicating whether or not the existing OS license data is stored on the non-volatile memory;
    retrieving the stored OS history information from the non-volatile memory of the local information handling system; and
    transmitting the retrieved OS history information across a network from the local information handling system to a separate and remote information handling system;
    where the method further comprises detecting an OS damage and:
        executing a system basic input/output system (BIOS) on the programmable integrated circuit of the local information handling system to respond to detected OS damage by launching a user assistance application on the programmable integrated circuit of the information handling system to repair damage to the OS,
        executing the user assistance application on the programmable integrated circuit of the local information handling system to request the stored OS history information from the BIOS,
        executing the BIOS on the programmable integrated circuit of the local information handling system to respond to the request from the user assistance application for the stored OS history information by performing the step of retrieving the stored OS history information and providing the retrieved OS history information to the user assistance application, and
        executing the user assistance application on the programmable integrated circuit of the local information handling system to receive the retrieved OS history information from the BIOS and perform the step of transmitting the retrieved OS history information to the remote information handling system.

7. A method, comprising performing the following steps during booting of a current operating system (OS) on a programmable integrated circuit of a local information handling system:
    accessing firmware on non-volatile memory of the local information handling system to determine whether or not existing OS license data is stored on the non-volatile memory;
    initializing the current OS for execution on the programmable integrated circuit of the local information handling system;
    determining a type of the current initialized OS based on unique OS initialization characteristics that are specific to the current OS;
    storing OS history information on the non-volatile memory of the local information handling system, the OS history information indicating the determined type of current initialized OS and indicating whether or not the existing OS license data is stored on the non-volatile memory;
    retrieving the stored OS history information from the non-volatile memory of the local information handling system; and
    transmitting the retrieved OS history information across a network from the local information handling system to a separate and remote information handling system;
    where the method further comprises:
        executing a system basic input/output system (BIOS) on the programmable integrated circuit of the local information handling system to boot and load the OS on the programmable integrated circuit of the information handling system;
        executing the OS on the programmable integrated circuit of the information handling system to automatically launch a designated application on the programmable integrated circuit;
        executing the designated application on the programmable circuit of the information handling system to request the stored OS history information from the BIOS;
        executing the BIOS on the programmable integrated circuit of the local information handling system to respond to the request from the designated application for the stored OS history information by performing the step of retrieving the stored OS history information and providing the retrieved OS history information to the designated application; and
        executing the designated application on the programmable integrated circuit of the local information handling system to receive the retrieved OS history information from the BIOS and perform the step of transmitting the retrieved OS history information to the remote information handling system.

8. A method, comprising performing the following steps during booting of a current operating system (OS) on a programmable integrated circuit of a local information handling system:
    accessing firmware on non-volatile memory of the local information handling system to determine whether or not existing OS license data is stored on the non-volatile memory;
    initializing the current OS for execution on the programmable integrated circuit of the local information handling system;
    determining a type of the current initialized OS based on unique OS initialization characteristics that are specific to the current OS;

storing OS history information on the non-volatile memory of the local information handling system, the OS history information indicating the determined type of current initialized OS and indicating whether or not the existing OS license data is stored on the non-volatile memory;

retrieving the stored OS history information from the non-volatile memory of the local information handling system; and transmitting the retrieved OS history information across a network from the local information handling system to a separate and remote information handling system;

where the step of storing OS history information on the non-volatile memory of the local information handling system comprising incrementing a boot counter corresponding to the determined type of current initialized OS that is maintained as OS history information on the non-volatile memory of the local information handling system; and where the method further comprises maintaining separate boot counters for at least two different types of OS as the OS history information on the non-volatile memory of the local information handling system, one of the separate boot counters corresponding to the determined type of current initialized OS.

9. The method of claim 8, where the separate boot counters comprise a first boot counter for a proprietary OS and a second boot counter for an open source OS.

10. A method, comprising performing the following steps during booting of a current operating system (OS) on a programmable integrated circuit of a local information handling system:

accessing firmware on non-volatile memory of the local information handling system to determine whether or not existing OS license data is stored on the non-volatile memory;

initializing the current OS for execution on the programmable integrated circuit of the local information handling system;

determining a type of the current initialized OS based on unique OS initialization characteristics that are specific to the current OS;

storing OS history information on the non-volatile memory of the local information handling system, the OS history information indicating the determined type of current initialized OS and indicating whether or not the existing OS license data is stored on the non-volatile memory;

retrieving the stored OS history information from the non-volatile memory of the local information handling system; and transmitting the retrieved OS history information across a network from the local information handling system to a separate and remote information handling system;

where the method further comprises receiving a user request to download an update to a system basic input/output system (BIOS) and executing the system BIOS on the programmable integrated circuit of the local information handling system to perform the steps of retrieving the stored OS history information and transmitting the retrieved OS history information to the remote information handling system in response to receipt of the user request to download the update to the BIOS.

11. A local information handling system, comprising:
a programmable integrated circuit; and
non-volatile memory coupled to the programmable integrated circuit;

where the programmable integrated circuit is programmed to perform the following during booting of a current operating system (OS):

accessing firmware on the non-volatile memory of the local information handling system to determine whether or not the existing OS license data is stored on the non-volatile memory, initializing the current OS, determining a type of the current initialized OS based on unique OS initialization characteristics that are specific to the current OS, the OS initialization characteristics comprising unique OS-specific arguments used by the current OS to call an Advanced Configuration and Power Interface (ACPI) initialization method, storing OS history information on the non-volatile memory, the OS history information indicating the determined type of current initialized OS and indicating whether or not existing OS license data is stored on the non-volatile memory, retrieving, via the firmware, the stored OS history information from the non-volatile memory of the local information handling system, and transmitting the retrieved OS history information across a network coupled to the programmable integrated circuit from the local information handling system to a separate remote information handling system.

12. The local information handling system of claim 11, where the programmable integrated circuit is programmed to perform the storing of the OS history information on the non-volatile memory of the local information handling system by incrementing a boot counter corresponding to the determined type of current initialized OS that is maintained as OS history information on the non-volatile memory of the local information handling system.

13. A local information handling system, comprising:
a programmable integrated circuit; and
non-volatile memory coupled to the programmable integrated circuit;

where the programmable integrated circuit is programmed to boot a current operating system (OS) by:

accessing firmware on the non-volatile memory of the local information handling system to determine whether or not existing OS license data is stored on the non-volatile memory, initializing the current OS, determining a type of the current initialized OS based on unique OS initialization characteristics that are specific to the current OS, storing OS history information on the non-volatile memory, the OS history information indicating the determined type of current initialized OS and indicating whether or not the existing OS license data is stored on the non-volatile memory, retrieving, via the firmware, the stored OS history information from the non-volatile memory of the local information handling system, and transmitting the retrieved OS history information across a network coupled to the programmable integrated circuit from the local information handling system to a separate remote information handling system;

where the programmable integrated circuit is programmed to perform the storing of the OS history information on the non-volatile memory of the local information handling system by incrementing a boot counter corresponding to the determined type of current initialized OS that is maintained as OS history information on the non-volatile memory of the local information handling system; and where the programmable integrated circuit is programmed to maintain separate boot counters for at least two different types of OS as the OS history information on the non-volatile memory of the local information handling system, one of the separate boot counters corresponding to the determined type of current initialized OS.

14. The local information handling system of claim 13, where the separate boot counters comprise a first boot counter for a proprietary OS and a second boot counter for an open source OS.

15. A local information handling system, comprising:
a programmable integrated circuit; and
non-volatile memory coupled to the programmable integrated circuit;
where the programmable integrated circuit is programmed to boot a current operating system (OS) by:
accessing firmware on the non-volatile memory of the local information handling system to determine whether or not existing OS license data is stored on the non-volatile memory,
initializing the current OS,
determining a type of the current initialized OS based on unique OS initialization characteristics that are specific to the current OS,
storing OS history information on the non-volatile memory, the OS history information indicating the determined type of current initialized OS and indicating whether or not the existing OS license data is stored on the non-volatile memory,
retrieving the stored OS history information from the non-volatile memory of the local information handling system, and
transmitting the retrieved OS history information across a network coupled to the programmable integrated circuit from the local information handling system to a separate remote information handling system;
where the programmable integrated circuit is programmed to execute a system basic input/output system (BIOS) to perform the retrieving of the stored OS history information and the transmitting of the retrieved OS history information to the remote information handling system in response to receipt of a user request to download an update to the BIOS.

16. A local information handling system, comprising:
a programmable integrated circuit; and
non-volatile memory coupled to the programmable integrated circuit;
where the programmable integrated circuit is programmed to boot a current operating system (OS) by:
accessing firmware on the non-volatile memory of the local information handling system to determine whether or not existing OS license data is stored on the non-volatile memory,
initializing the current OS,
determining a type of the current initialized OS based on unique OS initialization characteristics that are specific to the current OS,
storing OS history information on the non-volatile memory, the OS history information indicating the determined type of current initialized OS and indicating whether or not the existing OS license data is stored on the non-volatile memory,
retrieving the stored OS history information from the non-volatile memory of the local information handling system, and
transmitting the retrieved OS history information across a network coupled to the programmable integrated circuit from the local information handling system to a separate remote information handling system; and
where the programmable integrated circuit is programmed to:
execute a system basic input/output system (BIOS) to respond to detected OS damage by launching a user assistance application to repair damage to the OS,
execute the user assistance application to request the stored OS history information from the BIOS,
execute the BIOS on to respond to the request from the user assistance application for the stored OS history information by performing the retrieving of the stored OS history information and the providing of the retrieved OS history information to the user assistance application, and
execute the user assistance application to receive the retrieved OS history information from the BIOS and perform the transmitting the retrieved OS history information to the remote information handling system.

17. A local information handling system, comprising:
a programmable integrated circuit; and
non-volatile memory coupled to the programmable integrated circuit;
where the programmable integrated circuit is programmed to boot a current operating system (OS) by:
accessing firmware on the non-volatile memory of the local information handling system to determine whether or not existing OS license data is stored on the non-volatile memory,
initializing the current OS,
determining a type of the current initialized OS based on unique OS initialization characteristics that are specific to the current OS,
storing OS history information on the non-volatile memory, the OS history information indicating the determined type of current initialized OS and indicating whether or not the existing OS license data is stored on the non-volatile memory,
retrieving the stored OS history information from the non-volatile memory of the local information handling system, and
transmitting the retrieved OS history information across a network coupled to the programmable integrated circuit from the local information handling system to a separate remote information handling system; and
where the programmable integrated circuit is programmed to:
execute a system basic input/output system (BIOS) to boot and load the OS on the programmable integrated circuit,
execute the OS to automatically launch a designated application on the programmable integrated circuit,
execute the designated application to request the stored OS history information from the BIOS,
execute the BIOS to respond to the request from the designated application for the stored OS history information by performing the retrieving of the stored OS history information and the providing of the retrieved OS history information to the designated application, and execute the designated application to receive the retrieved OS history information from the BIOS and to perform the transmitting of the retrieved OS history information to the remote information handling system.

18. A system comprising a local information handling system coupled across a network to a separate remote information handling system; where the local information handling system comprises:

a programmable integrated circuit; and non-volatile memory coupled to the programmable integrated circuit;

where the programmable integrated circuit of the local information handling system is programmed to perform the following during booting of a current operating system (OS) on the local information handling system by:

accessing firmware on the non-volatile memory of the local information handling system to determine whether or not existing OS license data is stored on the non-volatile memory, initializing the current OS, determining a type of the current initialized OS based on unique OS initialization characteristics that are specific to the current OS, the OS initialization characteristics comprising unique OS-specific arguments used by the current OS to call an Advanced Configuration and Power Interface (ACPI) initialization method, storing OS history information on the non-volatile memory, the OS history information indicating the determined type of current initialized OS and indicating whether or not the existing OS license data is stored on the non-volatile memory, retrieving, via the firmware, the stored OS history information from the non-volatile memory of the local information handling system, and transmitting the retrieved OS history information across the network coupled to the remote information handling system.

19. The system of claim 18, where the remote information handling system comprises a programmable integrated circuit that is programmed to analyze the retrieved OS history information to determine a type of a first OS that was originally installed on the local information handling system, and a type of any second OS that was installed on the local information handling system after the first OS was installed on the local information handling system.

20. The system of claim 19, where the remote information handling system further comprises non-volatile memory coupled to the programmable integrated circuit of the remote information handling system and storing predefined data analysis information; and where the programmable integrated circuit of the remote information handling system is programmed to:

access the stored data analysis information on the non-volatile memory of the remote information handling system and analyze the retrieved OS history information using the data analysis information; and take at least one automatic action based on the determined type of the first OS that was originally installed on the local information handling system and the determined type of any second OS that was installed after the first OS on the local information handling system;

where the automatic action comprises either changing a type of remote manufacturer or vendor updates to be made to the local system, or requiring a user of the local system to enter a valid OS license key for a type of proprietary OS executing on the local system before downloading any future manufacturer or vendor updates to the local system.

* * * * *